United States Patent
Kim et al.

(10) Patent No.: US 11,053,625 B2
(45) Date of Patent: Jul. 6, 2021

(54) WASHING MACHINE

(71) Applicant: SAMSUNG ELECTRONICS CO., LTD., Suwon-si (KR)

(72) Inventors: Sang Wook Kim, Suwon-si (KR); Dong Geun Park, Yongin-si (KR); Won Young Seo, Suwon-si (KR)

(73) Assignee: SAMSUNG ELECTRONICS CO., LTD, Suwon-si (KR)

(*) Notice: Subject to any disclaimer, the term of this patent is extended or adjusted under 35 U.S.C. 154(b) by 15 days.

(21) Appl. No.: 16/329,306

(22) PCT Filed: Jul. 18, 2017

(86) PCT No.: PCT/KR2017/007690
§ 371 (c)(1),
(2) Date: Feb. 28, 2019

(87) PCT Pub. No.: WO2018/043912
PCT Pub. Date: Mar. 8, 2018

(65) Prior Publication Data
US 2019/0249348 A1    Aug. 15, 2019

(30) Foreign Application Priority Data
Aug. 29, 2016 (KR) .................. 10-2016-0109997

(51) Int. Cl.
D06F 37/14    (2006.01)
D06F 37/22    (2006.01)
(Continued)

(52) U.S. Cl.
CPC .............. D06F 37/22 (2013.01); D06F 37/14 (2013.01); D06F 37/225 (2013.01); D06F 37/24 (2013.01);
(Continued)

(58) Field of Classification Search
CPC ........ D06F 37/14; D06F 37/22; D06F 37/225; D06F 37/24; D06F 37/245; D06F 37/26; D06F 37/42; F16F 15/131
(Continued)

(56) References Cited

U.S. PATENT DOCUMENTS

2016/0145789 A1* 5/2016 Kim ...................... D06F 37/245
68/171

FOREIGN PATENT DOCUMENTS

| CN | 105492673 | 4/2016 |
|----|-----------|--------|
| JP | 2003-79993 | 3/2003 |

(Continued)

OTHER PUBLICATIONS

International Search Report dated Sep. 26, 2017 in International Patent Application No. PCT/KR2017/007690.
(Continued)

Primary Examiner — Levon J Shahinian
(74) Attorney, Agent, or Firm — Staas & Halsey LLP

(57) ABSTRACT

In the washing machine according to the present disclosure, the reinforcing member for reinforcing the strength of the balancer housing of the ball balancer is disposed on the outer surface of the balancer housing and includes a plurality of ribs. When the reinforcing member and the balancer housing are injected, a plurality of bumps may be formed inside the balancer housing by the plurality of ribs to affect the rolling of the ball. To prevent this, the reinforcing member is disposed in the area of the outer surface of the balancer housing corresponding to the non-contact surface on which the ball does not contact.

14 Claims, 15 Drawing Sheets

(51) Int. Cl.
    *D06F 37/24*      (2006.01)
    *D06F 37/26*      (2006.01)
    *D06F 37/42*      (2006.01)
    *F16F 15/131*     (2006.01)
(52) U.S. Cl.
    CPC ............ *D06F 37/245* (2013.01); *D06F 37/26* (2013.01); *D06F 37/42* (2013.01); *F16F 15/131* (2013.01)
(58) Field of Classification Search
    USPC .................. 68/12.02, 12.06, 23.1, 23.2, 140
    See application file for complete search history.

(56) References Cited

FOREIGN PATENT DOCUMENTS

| KR | 10-0244204 | 2/2000 |
| KR | 10-1157835 | 6/2012 |
| KR | 10-2015-0001636 | 1/2015 |
| KR | 10-1498037 | 2/2015 |

OTHER PUBLICATIONS

Written Opinion of the International Searching Authority dated Sep. 26, 2017 in International Patent Application No. PCT/ KR2017/ 007690.
Chinese Office Action dated Sep. 23, 2020 from Chinese Application No. 201780053537.6, 17 pages.
Chinese Office Action dated Apr. 25, 2021 from Chinese Application No. 201780053537.6.

\* cited by examiner ural Patent Application No. PCT/KR2017/007690 filed on
WASHING MACHINE

CROSS-REFERENCE TO RELATED APPLICATIONS

This application is a U.S. National Stage Application which claims the benefit under 35 U.S.C. § 371 of International Patent Application No. PCT/KR2017/007690 filed on Jul. 18, 2017, which claims foreign priority benefit under 35 U.S.C. § 119 of Korean Patent Application No. 10-2016-0109997 filed on Aug. 29, 2016 in the Korean Intellectual Property Office, the contents of both of which are incorporated herein by reference.

TECHNICAL FIELD

Embodiments of the present disclosure relate to a washing machine, and more particularly, to a ball balancer of the washing machine.

BACKGROUND ART

Generally, a washing machine is a device for washing laundry by performing washing, rinsing, dewatering and drying.

Types of the washing machine are divided in to a pulsator type that has a pulsator disposed at the bottom of the washing machine and impacts laundry by generating a water current, an agitator type that has a large stirring wing disposed at the center of a washing tub which regularly reverses the direction to generate a water current, and a drum type that has a drum in which laundry is put in, and the drum is rotated to shock the laundry caused by falling.

In the case of the pulsator type, the washing machine includes a tub containing water and a rotating tub rotatably installed in the tub, and the rotating tub containing laundry is rotated inside the tub to wash the laundry.

In recent years, there has been a washing machine provided with a ball balancer at the upper end of a rotary tub so that the rotation of the rotary tub may be stabilized early.

DISCLOSURE

Technical Problem

One aspect of the present disclosure provides a washing machine capable of reinforcing the strength of a ball balancer of the washing machine.

Another aspect of the present disclosure provides a washing machine including a rib provided so that a part of an outer appearance of a ball balancer of the washing machine is not visible to a user

Technical Solution

In accordance with one aspect of the present disclosure, the washing machine includes a tub, a washing tub rotatably installed inside the tub, the ball balancer disposed in the washing tub and including a balancer housing having an annular channel, at least one ball movably provided in the channel, and a reinforcing member disposed on an outer surface of the balancer housing, and the balancer housing includes a first inner surface including first contacts with which one side of the at least one ball contacts when the at least one ball moves and a second inner surface including second contacts with which the other side of the at least one ball contacts, and the reinforcing member is provided in an area of an outer surface of the balancer housing corresponding to an area between a first tracking path formed by the first contacts and a second tracking path formed by the second contacts.

Also, the first inner surface is provided to correspond to an outer circumferential surface of the balancer housing, and the second inner surface is connected to the first inner surface.

Also, the second inner surface is connected to a lower side of the first inner surface, and the reinforcing member is disposed below the first tracking path.

Also, the second inner surface is connected to a lower side of the first inner surface, and the reinforcing member is disposed outside the second tracking path in a radial direction of the channel Also, the channel further includes a non-contact portion formed between the first tracking path and the second tracking path and not contacting the at least one ball.

Also, all portions of the reinforcing member do not deviate from the area of the outer surface of the balancer housing corresponding to the area between the first tracking path and the second tracking path.

Also, the reinforcing member includes a plurality of ribs formed along the outer surface of the balancer housing.

Also, the plurality of ribs includes a plurality of first ribs extending in the circumferential direction of the channel and a plurality of second ribs extending in a direction intersecting the circumferential direction of the channel.

Also, an outer circumferential surface of the ball balancer is disposed to be in contact with an upper side of an inner circumferential surface of the washing tub and includes a hanging groove provided on an upper surface of the balancer housing in an annular shape, and the washing tub includes a hanging portion bent to the inside of the washing tub so as to be in contact with the hanging groove.

Also, the washing machine further includes a cover tub disposed above the tub and provided in an annular shape.

Also, the balancer housing includes a blocking rib disposed adjacent to an outer circumferential surface of the balancer housing and extending upwardly from an upper surface of the balancer housing and provided in an annular shape.

Also, an imaginary straight line connecting a first point of a lower end of an inner circumferential surface of the cover tub and a second point of an upper end of an outer circumferential surface of the washing tub does not penetrate an outer circumferential surface of the balancer housing.

Also, the cover tub includes the blocking rib disposed adjacent to an outer circumferential surface of the balancer housing and extending upwardly from an upper surface of the balancer housing and provided in an annular shape.

In accordance with another aspect of the present disclosure, a washing machine includes a tub, a washing tub rotatably installed inside the tub, a ball balancer disposed in the washing tub and including a balancer housing having an annular channel, at least one ball movably provided in the channel, and a reinforcing member reinforcing the rigidity of the balancer housing, and balancer housing includes a non-contact surface formed between first contacts with which one side of the at least one ball contacts and second contacts with which the other side of the at least one ball contacts when the at least one ball moves, and provided to be not contacting the at least one ball, and the reinforcing member is provided on an outer surface of the balancer housing and is disposed in an area of the outer surface of the balancer housing corresponding to the non-contact surface.

Also, all balancer housing includes a non-contact surface formed between first contacts with which one side of the at least one ball contacts and second contacts with which the other side of the at least one ball contacts when the at least one ball moves, and provided to be not contacting the at least one ball, and the reinforcing member is provided on an outer surface of the balancer housing and is disposed in an area of the outer surface of the balancer housing corresponding to the non-contact surface.

Also, the reinforcing member is disposed between a virtual horizontal plane passing through the first contacts and a virtual vertical plane passing through the second contacts.

Also, an outer circumferential surface of the ball balancer is disposed in contact with a circumferential surface of the washing tub, the balancer housing includes an hanging groove formed in an annular shape on an upper surface thereof, the washing tub includes a hanging portion bent to the inside of the washing tub so as to be hanging on the hanging groove.

Also, the balancer housing includes a blocking rib disposed radially inward of the hanging groove of the balancer housing and extending upward from the upper surface of the balancer housing and provided in an annular shape.

Also, the washing machine further includes a cover tub disposed above the tub and provided in an annular shape, and an imaginary straight line connecting a first point of a lower end of an inner circumferential surface of the cover tub and a second point of an upper end of an outer circumferential surface of the washing tub does not penetrate a latching portion.

In accordance with another aspect of the present disclosure, a washing machine includes a tub having an upper side opened, a washing tub rotatably installed inside the tub and opened at an upper side, a ball balancer disposed in the washing tub and including a balancer housing having an annular channel, at least one ball movably provided in the channel, and a reinforcing member reinforcing the rigidity of the balancer housing, and the balancer housing includes first contacts with which one side of the at least one ball contacts and a second inner surface including second contacts with which the other side of the at least one ball contacts when the at least one ball moves, and the reinforcing member is disposed below the first contacts and is formed outside the second contacts in the radial direction of the channel.

Also, the balancer housing includes a blocking rib disposed adjacent to an outer circumferential surface of the balancer housing and extending upwardly from an upper surface of the balancer housing Advantageous Effects The washing machine according to the present disclosure is provided with the reinforcing rib for reinforcing the strength of the ball balancer within the range that does not interfere with the movement of the ball of the ball balancer, thereby reinforcing the strength of the ball balancer and securing the reliability of the ball balancer.

In addition, it is possible to improve the aesthetics of the inside of the washing machine by including the blocking rib provided so that the part of the ball balancer cannot be seen by the user.

MODES OF THE INVENTION

Figure 1:
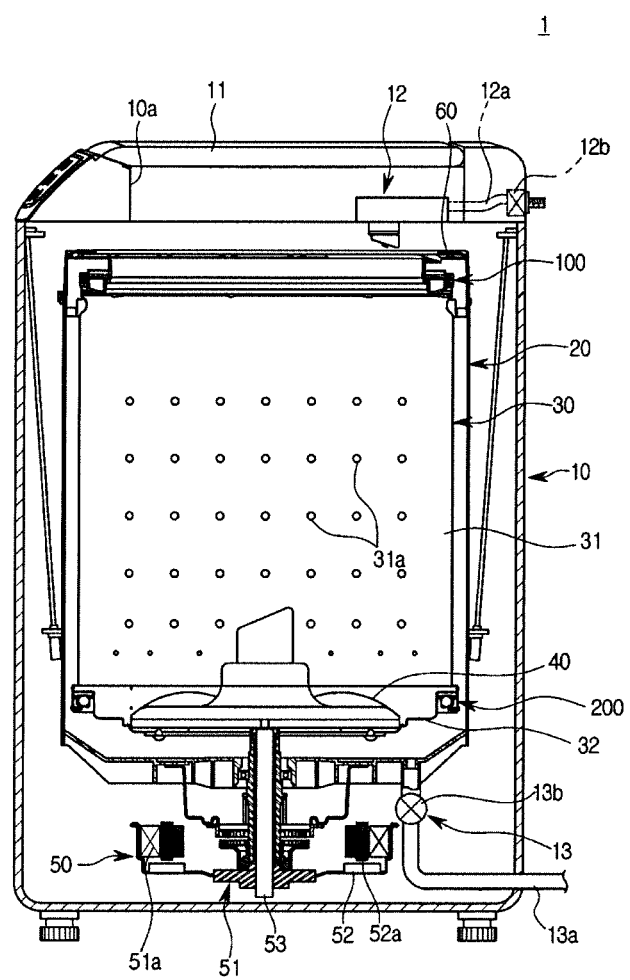
FIG. 1 is a sectional view of a washing machine according to an embodiment of the present disclosure.

Embodiments described in this specification and configurations illustrated in the drawings are only exemplary examples of the disclosed disclosure. The disclosure covers various modifications that may be substituted for the embodiments and drawings herein at the time of filing of this application.

In addition, the same reference numerals or symbols refer to parts or elements that perform substantially the same function.

In addition, terms used in the present specification are merely used to describe exemplary embodiments and are not intended to limit and/or restrict the embodiments. An expression used in the singular encompasses the expression of the plural unless it has a clearly different meaning in context. In the present specification, the terms such as "including," "having," and "comprising" are intended to indicate the presence of the features, numbers, steps, actions, elements, parts, or combinations thereof disclosed in the specification, and are not intended to preclude the possibility that one or more other features, numbers, steps, actions, elements, parts, or combinations thereof may be present or added.

In addition, it should be understood that although the terms "first," "second," etc. may be used herein to describe various elements, the elements should not be limited by these terms. These terms are only used to distinguish one element from another. For example, a first element could be termed a second element, and, similarly, a second element could be termed a first element without departing from the scope of the present disclosure. As used herein, the term "and/or" includes any and all combinations of one or more of the associated listed items.

An 'upper' and 'upper side' used herein are based on a top and bottom direction of a washing machine 1 shown in FIG. 1, that is 'upper side' or 'top' are a side where a door of the washing machine is disposed and 'lower side' or 'bottom' are other side where the opposite of the door.

Hereinafter, embodiments of the present disclosure will be described with reference to the accompanying drawings in detail.

As shown in FIG. 1, a washing machine according to an embodiment of the present disclosure includes a housing 10 forming an outer appearance thereof, a tub 20 disposed inside the housing 10 and containing water, a washing tub 30 rotatably installed in the tub 20, a pulsator 40 installed inside the washing tub 30 to generate a water flow, and a driving device 50 for rotating the pulsator 40.

The housing 10 includes a loading port 10a provided on an upper side of the housing for allowing a user to input laundry into the washing tub 30. A door 11 for opening and closing the loading port 10a is rotatably installed on the upper portion of the housing 10 and is supported by the housing 10.

The washing machine further includes a water supply device 12 disposed in an upper portion of the tub 20 to supply water to the tub 20 and a drainage device 13 disposed under the tub 20 to discharge water used for washing.

The water supply device 12 disposed in an upper portion of the tub 20 to supply water to the tub 20 and the drainage device 13 disposed under the tub 20 to discharge water used for washing.

The water supply device 12 includes a water supply pipe 12a connected to an external water supply source (not shown) and a water supply valve 12b disposed in the water supply pipe 12a to open and close the water supply pipe 12a. The drain pipe 13a connected to a lower portion of the tub 20 to guide the water in the tub 20 to the outside and a drain valve 13b disposed in the drain pipe 13a for opening and closing the drain pipe 13a.

The tub 20 is provided with a suspension inside the housing (10) to store water to be used for washing.

The washing tub 30 is formed in a cylindrical shape having an open top, and its axial line is arranged so as to be perpendicular to the horizontal plane so that the washing tub 30 rotates around a vertical axis and may be dewatered. The washing tub 30 has a cylindrical portion 31 formed in a cylindrical shape and a bowl portion 32 coupled to a lower portion of the cylindrical portion 31 and having the pulsator 40 rotatably installed therein.

The cylindrical portion 31 is formed by bending a plate member into a ring shape and includes a communication hole 31a provided to introduce the water in the tub 20 into the washing tub 30 and discharge the water in the washing tub to the tub 20. The washing machine includes ball balancers 100 and 200 provided on the upper and lower portions of the cylindrical portion 31 so as to stabilize the rotation of the washing tub 30 prematurely caused by an unbalanced load of the washing tub 30.

On the upper side of the tub 20, a cover tub 60 for preventing the detachment of laundry and the scattering of washing water is provided. The cover tub 60 is provided so as to cover the space between the tub 20 and the washing tub 30.

The washing water that has passed through the cylindrical portion 31 of the washing tub 30 due to the centrifugal force rises toward the cover tub 60 along the space between the tub 20 and the washing tub 30 when the washing tub 30 rotates, and then flows into the washing tub 30 after hitting the cover tub 14.

The driving device 50 includes a stator 51 having a coil 51a and a rotor 52 including a magnet 52a interacting with the coil 51a and rotating and interacting with the stator 51. A drive shaft 53 includes a lower end thereof connected to the center of the rotor 52 and an upper end thereof connected to the pulsator 40 to transmit a rotational force to the pulsator 40.

The ball balancers 100 and 200 include the upper ball balancer 100 provided on the upper portion of the cylindrical portion 31 and the lower ball balancer 200 provided below the cylindrical portion 31.

The upper ball balancer 100 and the lower ball balancer 200 are symmetrical in the vertical direction and other than the constitution of that of a blocking rib 150, to be described later is the same. So, hereinafter, the ball balancers 100 and 200 will be described with reference to the upper ball balancer 100, and the description of the upper ball balancer 100 will be also referred to as the ball balancer 100.

Figure 2:
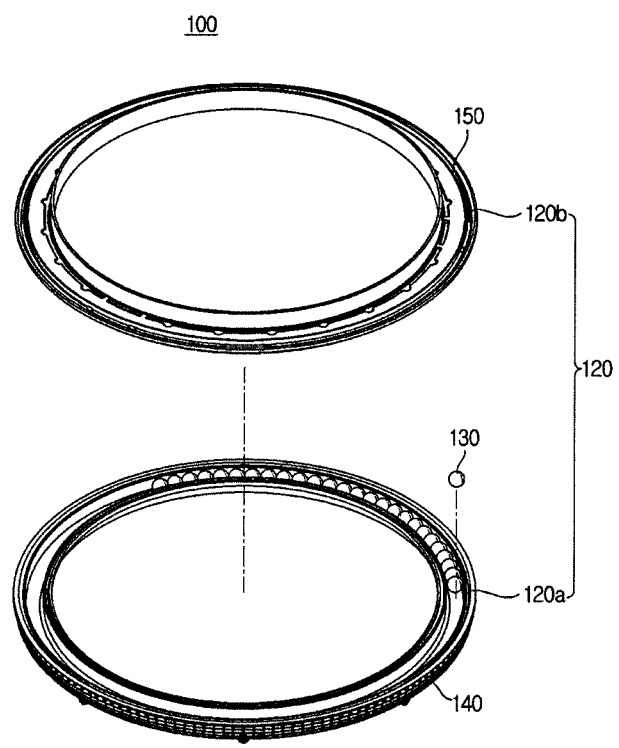
FIG. 2 is an exploded perspective view of a ball balancer of a washing machine according to an embodiment of the present disclosure.

The ball balancer 100 includes a balancer housing 120 having a channel 110 therein having an annular shape and a plurality of balls 130 movably installed in the channel 110 as shown in FIG. 2. Accordingly, the plurality of balls 130 may move in the circumferential direction along the channel 110.

In addition, the plurality of balls 130 and a viscous fluid (not shown) having a predetermined high viscosity oil may be accommodated in the channel 110. The viscous oil (not shown) may suppress the movement of the plurality of balls 130.

The balancer housing 120 of the ball balancer 100 includes a first balancer housing 120a and a second balancer housing 120b which are coupled to each other to formthea channel 110 therebetween.

In this embodiment, the first balancer housing 120a is provided with the annular channel 110 with an open upper side, and the second balancer housing 120b is coupled with the upper portion of the first balancer housing 120a that closes the upper side of the channel 110. The first balancer housing 120a is formed to have a U-shaped cross section that forms an outer surface 121 having an outer circumferential surface 122 and a bottom surface 123 of the balancer housing 120 and an inner circumferential surface 124. The second balancer housing 120b forms an upper surface 129 of the balancer housing 120.

In this embodiment, the first balancer housing 120a and the second balancer housing 120b are formed of resin, respectively, and are coupled to each other through fusion or the like.

Figure 3:
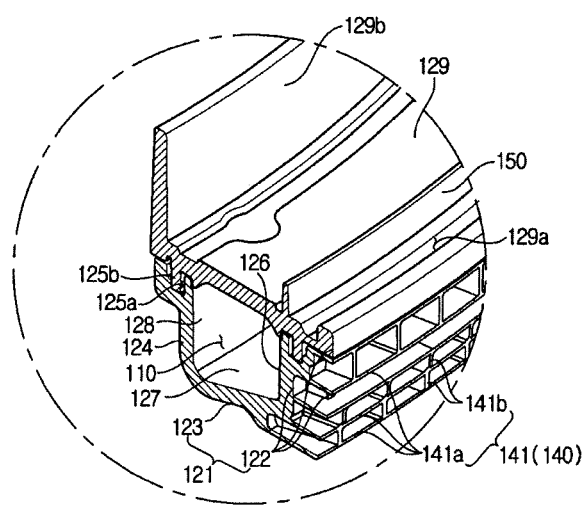
FIG. 3 is a cross-sectional perspective view of a ball balancer of a washing machine according to an embodiment of the present disclosure.

As shown in FIG. 3, coupling grooves 125a for fusing the second balancer housing 120b are provided on the outer and inner circumferential sides of the first balancer housing 120a respectively in an annular shape, and a coupling protrusion 125b protruding in an annular shape corresponding to the coupling grooves 125a and inserted and fused in the coupling grooves 125a is provided on the outer circumferential side and the inner circumferential side of the second balancer housing 120b respectively. Accordingly, the first balancer housing 120a and the second balancer housing 120b are coupled to each other by fusing the coupling protrusion 125*b* to the coupling groove 125*a*.

Hereinafter, a reinforcing member 140 of the ball balancer 100 will be described in detail. The first balancer housing 120*a* and the second balancer housing 120*b* are collectively referred to as the balancer housing 120.

The plurality of balls 130 of the ball balancer 100 may be rotated at a high speed in the channel 110 when the washing tub 30 is rotated at a high speed. If the rigidity of the balancer housing 120 is not secured at this time, the balancer housing 120 may be broken and the plurality of balls 130 may protrude to the outside of the balancer housing and causes a reliability problem of the washing machine 1.

To prevent this, in the case of a conventional ball balancer, the reinforcing member including a plurality of ribs used on the outer surface of the balancer housing reinforces the strength of the balancer housing. The plurality of ribs is disposed on the outer surface of the balancer housing and is integrally ejected together with the balancer housing.

As described above, the balancer housing is formed by an injection of resin and when the balancer housing is injecting a plurality of bumps may be formed at an area on the channel forming the inside of the balancer housing corresponding to an area where plurality of ribs is disposed.

If the plurality of bumps is formed in the channel, a large vibration may be additionally generated in the balancer housing at the time of high-speed rotation due to insufficient rolling of the balls. In the case of low-speed rotation, the rolling of the balls is restricted by the plurality of bumps and the reliability of the washing machine may be deteriorated.

In order to prevent this, the reinforcing member 140 according to this embodiment of the present disclosure may be disposed so that the plurality of balls 130 is moved without being restricted even if the channel 110 has bumps formed by integral injection of the reinforcing member 140 and the balancer housing 120.

Figure 4:
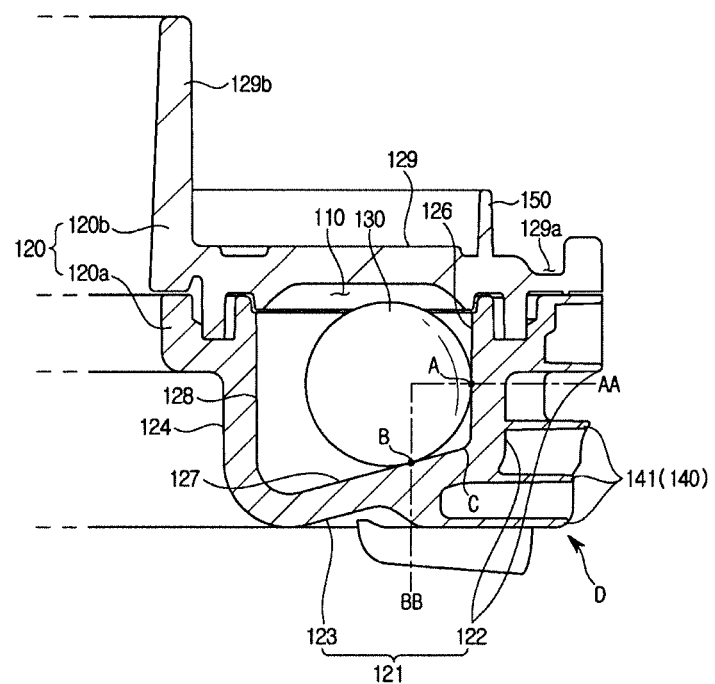
FIG. 4 is a sectional view of a ball balancer when a ball of the ball balancer of a washing machine according to the embodiment of the present disclosure is disposed on an outer peripheral surface side of balancer housing.
Figure 5:
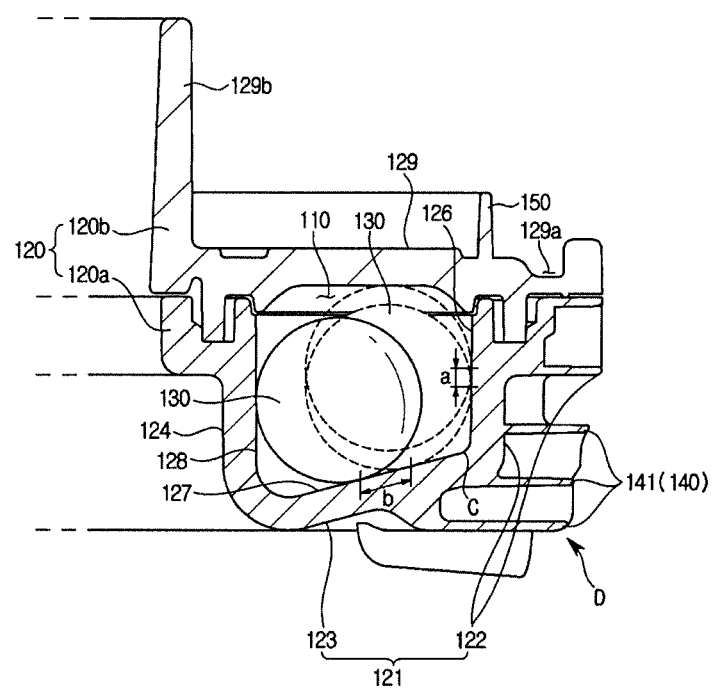
FIG. 5 is a sectional view of a ball balancer when a ball of the ball balancer of a washing machine according to the embodiment of the present disclosure is disposed on the inner circumferential surface side of balancer housing.

As shown in FIGS. 3 to 5, the balancer housing 120 includes a first inner surface 126 including first contacts A that are in contact with a point of a side of the plurality of balls 130, and a second inner surface 127 that includes second contacts B that are in contact with a point on a lower portion of the second inner surface 127.

The first inner surface 126 may correspond to the outer circumferential surface 122 of the balancer housing 120 and the second inner surface 127 may correspond to the bottom surface 123 of the balancer housing 120. That is, the first inner surface 126 forms a side surface of the channel 110, and the second inner surface 127 forms a bottom surface of the channel 110.

The balancer housing 120 may also include a third inner surface 128 that corresponds to the inner circumferential surface 124.

The second inner surface 127 may be connected to a bottom surface of the first inner surface 126 at a predetermined angle with the first inner surface 126. The second inner surface 127 may be inclined downward toward the inner circumferential surface 124 of the balancer housing 120. However, it is not limited to this, and it may be provided horizontally with respect to the bottom side.

As shown in FIG. 5, the plurality of balls 130 is disposed on the inner circumferential surface 124 by an inclination of the second inner surface 127 in the stopped state, the plurality of balls 130 may be moved toward the outer circumferential surface 122 of the balancer housing 120 and rotated by centrifugal force generated by the rotation of the ball.

The first contacts A that are in contact with any one side of the sides of the plurality of balls 130 may be disposed at the positions shown in FIG. 4, and the first contacts A may be disposed on the upper side of the position shown in FIG. 5 in accordance with the rotation of the plurality of balls 130. That is, the first contacts A may be disposed on a first section a of the first inner surface 126.

The second contacts B may also be disposed at the positions shown in FIG. 5 and may be disposed radially inwardly of the position shown in FIG. 5 in the radial direction of the channel 110 as the plurality of balls 130 are rotated. The second contacts B may be disposed on a second section b of the second inner surface 127.

However, the first contacts A and the second contacts B described below are the first contacts A that may be disposed at the lowermost position in the first contacts A as shown in FIG. 4, and the second contacts B that may be disposed on the outermost side in the radial direction of the channel 110 in the second contacts B.

Figure 6:
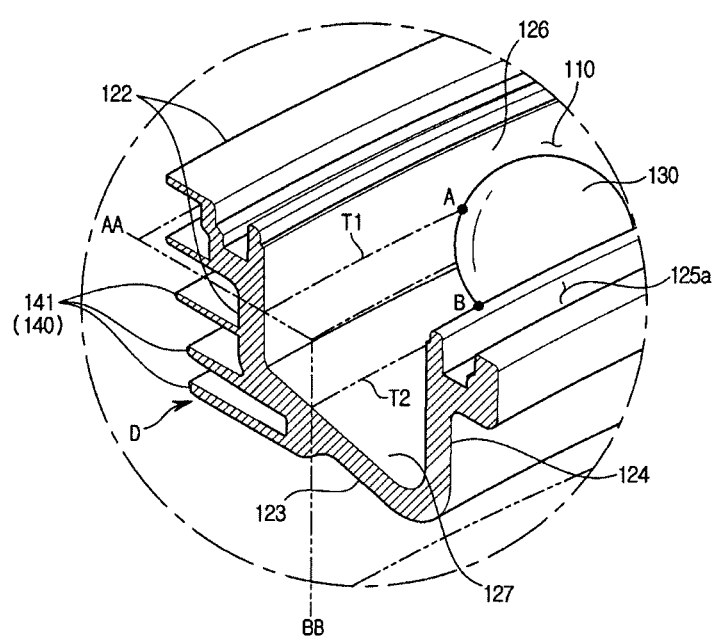
FIG. 6 is a partial cross-sectional perspective view of a lower balancer housing of a ball balancer of a washing machine according to an embodiment of the present disclosure.

As shown in FIG. 6, the first contacts A may form a first tracking path T1 formed along the first inner surface 126 in an annular shape, and the second contacts B may form a second tracking path T2 formed along the second inner surface 127 in an annular shape.

A noncontact portion C in which the plurality of balls 130 are not in contact with may be formed between the first tracking path T1 and the second tracking path T2. Since the plurality of balls 130 are provided in a circular shape, the first inner surface 126 includes the first contacts A that make point contact with one point on the side of the plurality of balls 130, and the second inner surface 127 includes the second contacts B that are in point contact with another point on the side of the plurality of balls 130. A portion of the first inner surface 126 and a portion of the second inner surface 127 positioned between the first contacts A and the second contact B may not be in contacts with the plurality of balls 130

The reinforcing member 140 may be formed on the outer surface 121 of the balancer housing 120 as shown in FIGS. 3 to 6. In detail, the reinforcing member 140 may be disposed in an area D on the balancer housing 120 corresponding to the area on the inside of the balancer housing 120 between the first tracking path T1 and the second tracking path T2.

The reinforcing member 140 may include a plurality of ribs 141 extending outwardly from the outer surface 121 of the balancer housing 120 and facing outward. The plurality of ribs 141 may be integrally injected with the balancer housing 120.

The first inner surface 126 and the second inner surface 127 of the balancer housing 120 may include a plurality of bumps being formed in a process of injection by the plurality of ribs 141 extending from the outer surface 121. Since the plurality of ribs 141 are disposed in the area D on the outer surface 121 of the balancer housing 120 corresponding to the first tracking path T1 and the second tracking path T2 as described above, the plurality of bumps be formed between the first tracking path T1 and the second tracking path T2.

That is, the plurality of bumps may be formed on the first and second inner surfaces 126 and 127 by the reinforcing member 140 in the injection process. However, the plurality of bumps may be formed on the inside of the non-contact portion C of the first and second inner surfaces 126 and 127 channel that the plurality of balls 130 may be smoothly moved in the channel 110 without being restricted by the plurality of bumps.

Forming of the plurality of bumps on the inner surfaces 126 and 127 of the balancer housing 120 may not be avoided by forming of the plurality of ribs 141 in the injection process, but the area D where the plurality of ribs 141 are disposed are set to a predetermined section so that an area where the plurality of bumps disposed may be controlled not to interrupt the rolling of the plurality of balls 130.

In other words, the plurality of ribs 141 of the reinforcing member 140 may be disposed in the area D of the outer surface 121 of the balancer housing 120 corresponding to the non-contact portion C. A region of all the reinforcing member 140 located is formed in the area D on the outer surface 121 of the balancer housing 120 corresponding to the non-contact portion C in order to prevent the plurality of bumps being formed outside of the non-contact portion C.

The non-contact portion C may be disposed between a virtual horizontal plane AA passing through the first contacts A and a vertical plane BB passing through the second contacts B. The reinforcing member 140 may be disposed on the outer surface 121 of the balancer housing 120 in the area D formed between the horizontal plane AA and the vertical plane BB.

Since the plurality of bumps is only being formed on the non-contact portion C, the rolling of the plurality of balls 130 is not being interrupted by the plurality of bumps in a state that the plurality of balls 130 move toward the inner circumferential surface 124 of the balancer housing 120 as shown in FIG. 5 or even in a state that the plurality of balls 130 move toward the upper surface 29 side of the balancer housing 120.

The plurality of ribs 141 may include a plurality of first ribs 141a extending in the circumferential direction of the channel 110 and a plurality of second ribs 141b intersecting the plurality of first ribs 141a.

Since the plurality of first ribs 141a and the plurality of second ribs 141b are formed on the outer surface 121 of the balancer housing 120 while being intersected with each other, a value of the second moment of area on the outer side of the balancer housing 120 may be increased so that the rigidity of the balancer housing 120 may be increased.

Hereinafter, reinforcing members 140' and 140" of the washing machine 1 according to another embodiment of the present disclosure will be described. The configuration of the ball balancer reinforcing members 140' and 140" described below corresponds to that of the above-described embodiment of the present disclosure, and a duplicate description will be omitted.

Figure 7:
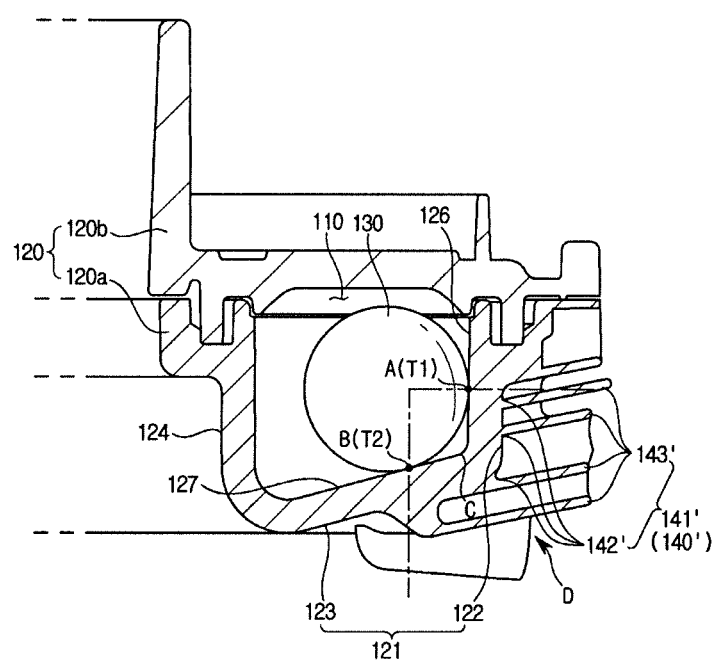
FIG. 7 is a sectional view of a ball balancer of a washing machine according to another embodiment of the present disclosure.

As shown in FIG. 7, a plurality of ribs 141' may be formed integrally with the balancer housing 120, as described above. The plurality of ribs 141' may include a connecting portion 142' that forms one end of the plurality of ribs 141' and is connected to the outer surface 121 of the balancer housing 120.

An other end 143' of the plurality of ribs 141' may be disposed outside the outer surface 121 of the balancer housing 120 in the radial direction of the balancer housing 120.

Here, only the connecting portion 142' of the plurality of ribs 141' are connected to the area D of the outer surface 121 of the balancer housing 120 corresponding to the area between the first tracking path T1 and the second tracking path T2 or the non-contact portion C. The other end 143' of the plurality of ribs 141', unlike the connecting portion 142', may be disposed outside of the area D of the outer surface 121 of the balancer housing 120.

Therefore, unlike the reinforcing member 140 according to the embodiment of the present disclosure, the reinforcing member 140' according to another embodiment of the present disclosure is configured such that only the connecting portion 142' is disposed on the area D of the outer surface 121 of the balancer housing 120 corresponding to the area between the first tracking path T1 and the second tracking path T2 or the non-contact portion C, and the plurality of ribs 141' except for the connecting portion 142', likes the other end 143' or some portion of the plurality of ribs 141', may be disposed outside of the area D.

Figure 8:
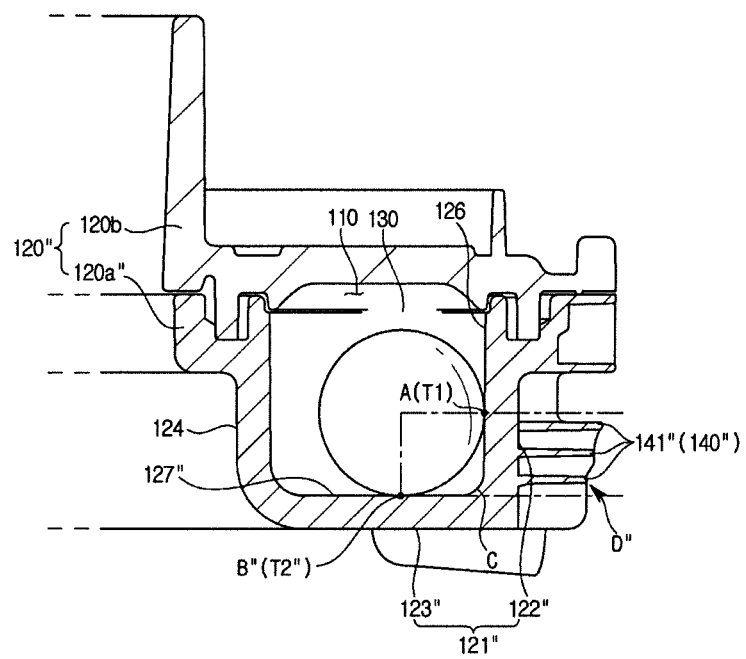
FIG. 8 is a sectional view of a ball balancer of a washing machine according to another embodiment of the present disclosure.

As shown in FIG. 8, the plurality of ribs 141" of the reinforcing member 140" in accordance with another embodiment of the present disclosure may be disposed on the outer circumferential surface 122" of an outer surface 121" of a balancer housing 120". When a bottom surface 123" of the balancer housing 120" is formed horizontally, an area D" corresponding to the area between the first tracking path T1 and a second tracking path T2" or a non-contact portion C" may be formed only on the outer circumferential surface 122" of the balancer housing 120". Thus, a connecting portion 142" of the plurality of ribs 141" may be formed only on the outer circumferential surface 122".

Figure 9:
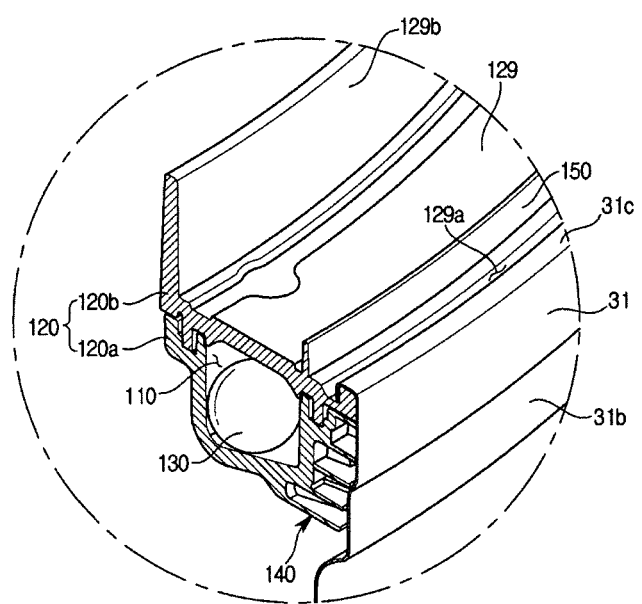
FIG. 9 is a partial cross-sectional perspective view of a ball balancer of a washing machine supported by a washing tub according to an embodiment of the present disclosure.

As shown in FIG. 9, the balancer housing 120 according to an embodiment of the present disclosure may be installed inside the cylindrical portion 31 of the washing tub 30. At least a portion of the outer circumferential surface 122 of the balancer housing 120 is supported on the inner circumferential surface of the cylindrical portion 31 so that the first balancer housing 120a and the second balancer housing 120b corresponding to the inner circumferential surface of the cylindrical portion 31 (The portion where the coupling groove 125a and the coupling protrusion 125b are engaged) is supported by the cylindrical portion 31 so that the strength of the coupling portion may be reinforced by the cylindrical portion 31.

An upper portion of the cylindrical portion 31 is provided with a seating portion 31b protruding radially inwardly of the cylindrical portion 31 to seat the ball balancer 100 thereon.

The upper surface 129 of the ball balancer 100 is provided with a hanging groove 129a in a concave shape so that the ball balancer 100 may be stably installed in the cylindrical portion 31.

A hanging portion 31c formed to correspond to the ball balancer 100 at the upper end of the cylindrical portion 31 is provided. The hanging portion 31c is formed by bending a part of the upper end of the cylindrical portion 31 and is bent to be inserted into the hanging groove 129a so as to be caught in the hanging groove 129a. That is, the hanging portion 31c formed at the upper end of the cylindrical portion 31 is caught by the hanging groove 129a provided on the upper surface 129 of the ball balancer 100 to limit the upward movement of the ball balancer 100.

Figure 10:
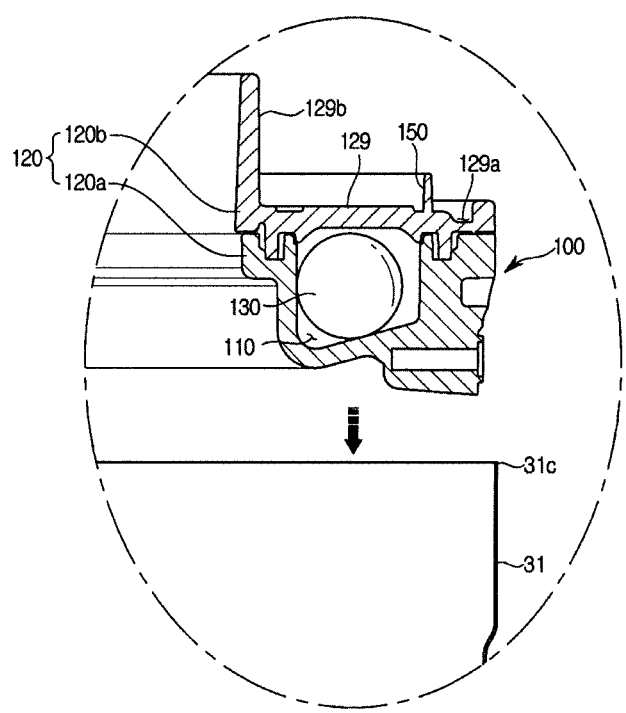
FIGS. 10 to 12 are views sequentially showing the installation process of the ball balancer of the washing machine according to the embodiment of the present disclosure.
Figure 11:
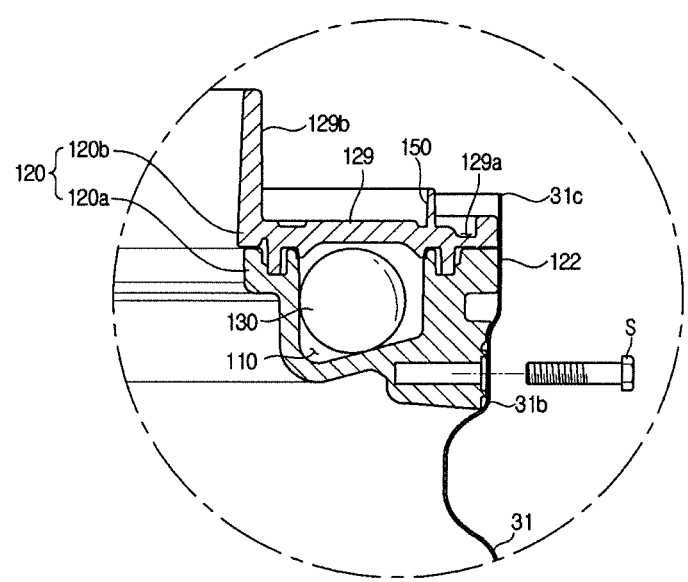

The ball balancer 100 is inserted into the cylindrical portion 31 from the upper side of the cylindrical portion 31 as shown in FIG. 10 so that the ball balancer 100 is inserted into the seat portion 31b as shown in FIG. 11.

The ball balancer 100 is fixed to the cylindrical portion 31 through the fastening member S such as a screw in a state where the ball balancer 100 is seated on the seat portion 31b.

Figure 12:
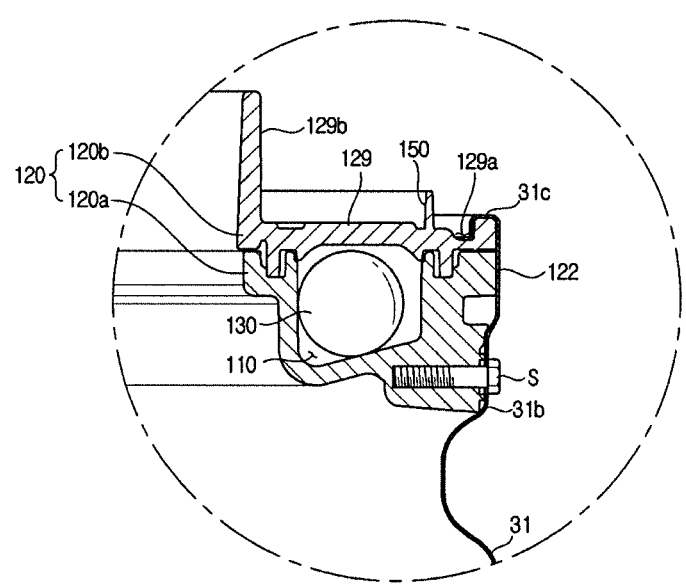

Subsequently, as shown in FIG. 12, the upper end of the cylindrical portion 31 is bent to form the hanging portion 31c to be inserted into the hanging groove 129a, and the upward movement of the ball balancer 100 is limited through the hanging groove 129a and the hanging portion 31c so that the ball balancer 100 installed on the cylindrical portion 31 may be stably installed.

Hereinafter, the blocking rib 150 provided to prevent the hanging portion 31c from being exposed to the user at the loading port 10a will be described in detail.

As described above, at one end of the cylindrical portion 31, the hanging portion 31c is provided and the hanging portion 31c is bent. The washing tub 30 is generally formed of a steel material and has an annular shape in cross section in the vertical direction at one end of the cylindrical portion 31. When the hanging portion 31c is bent from the upper side to the lower side, a curved surface of the hanging portion 31c may not be formed smoothly.

If the non-smooth curved surface of the hanging portion 31c is exposed to the outside, there is a possibility that an aesthetic sense of the washing machine 1 is decreased. According to the embodiment of the present disclosure, when the user opens the door 11, as shown in FIG. 13, the ball balancer 100 includes the blocking rib 150 preventing the hanging portion 31c from being exposed to the outside to the user.

The blocking ribs 150 may have an annular shape extending upwardly from the upper surface 129 of the balancer housing 120. The blocking ribs 150 may be disposed adjacent to the outer circumferential surface 122 of the balancer housing 120 or the hanging groove 129a and may be disposed inwardly of the hanging groove 129a in the radial direction of the balancer housing 120 (refer to FIG. 4).

Figure 13:
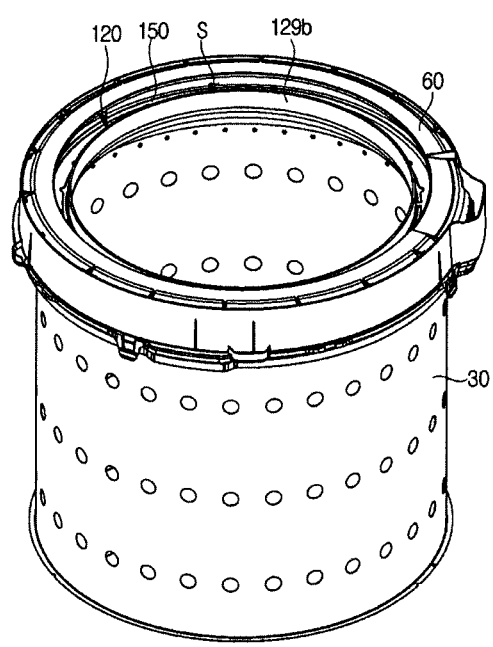
FIG. 13 is a perspective view of a ball balancer and a cover tub of a washing machine according to an embodiment of the present disclosure.

As shown in FIG. 13, the hanging portion 31c extends upward from the inner circumferential surface 124 of the balancer housing 120 and may be exposed to the user through a gap s between an upper end of a guide rib 129b for guiding laundry into the washing tub 30 and a bottom end of the inner circumferential surface 61 of the cover tub 60.

The blocking rib 150 is provided between the gap s and the hanging portion 31c to block the hanging portion 31c, which may be seen between the gap s in the user's view.

Figure 14:
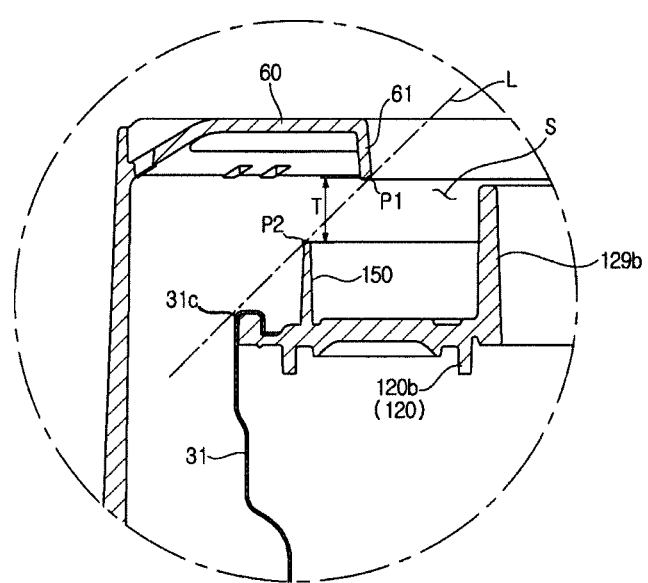
FIG. 14 is an enlarged view of a part of a section of a washing machine according to an embodiment of the present disclosure.

In detail, as shown in FIG. 14, an imaginary straight line L connecting one point P1 of the bottom end of the inner circumferential surface 61 of the tub cover 60 and one point P2 of the upper end of the blocking rib 150 may be provided so as not to penetrate the hanging portion 31c.

The straight line L represents the lower boundary of the viewable range that is closest to the hanging portion 31c through the gap s, and if the straight line L does not pass through the hanging portion 31c, then the hanging portion 31c is not seen in the user's view.

The user may see the outer side of the hanging portion 31c in the radial direction of the balancer housing 120 through the gap s so that the hanging portion 31c does not enter the user's view by the blocking rib 150.

Thus, the straight line L may be extended to pass over the upper portion of the hanging portion 31c or the upper portion of the outer circumferential surface 122 of the balancer housing 120.

Since the washing tub 30 rotates about the drive shaft 53 which is a rotation axis of the washing tube 30, a swing of the washing tub 30 due to a difference in the center of gravity of the washing tub 30 and due to the unevenness of the laundry in the washing tub 30 may be generated (refer to FIG. 1).

A predetermined separation distance T may be provided between the blocking rib 150 and the cover tub 60 to prevent a collision between the blocking rib 150 and the cover tub 60 when the washing tub 30 is shaken and the blocking rib 150 is interlocked with the washing tub 30.

Hereinafter, a blocking rib 150' according to another embodiment of the present disclosure will be described. The configuration other than the blocking rib 150' described below is the same as the configuration according to the embodiment of the present disclosure described above, and the description is omitted.

Figure 15:
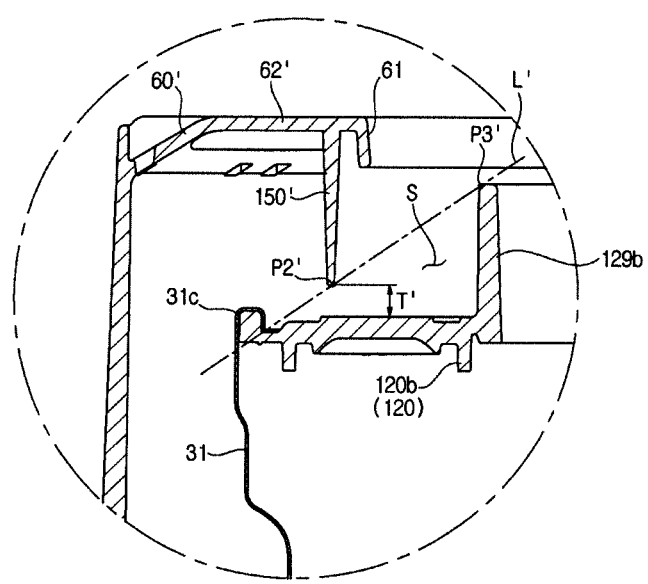
FIG. 15 is an enlarged view of a part of a cross section of a washing machine according to another embodiment of the present disclosure.

The blocking rib 150' may extend downward from a lower surface 62' of a cover tub 60'. As shown in FIG. 15, an imaginary straight line L' connecting one point P3' on the upper end of the guide rib 129b and one point P2' of the bottom of the blocking rib 150' may be provided so as not to penetrate the hanging portion 31c.

The straight line L' represents an upper boundary of the viewable range of the user which is closest to the communication hole 31a through the gap s, and if the straight line L' does not pass through the hanging portion 31c, then the hanging portion 31c is not seen in the user's view.

The user may only see the inner side of the hanging portion 31c in the radial direction of the balancer housing 120 through the gap s so that the hanging portion 31c does not enter the user's view by the blocking rib 150.

Further, a predetermined separation distance T' may be provided between the blocking rib 150' and the ball balancer 100.

The present disclosure is not limited to the above-described embodiments, and it should be clear to those skilled in the art that various modifications and changes may be made without departing from the scope of the present disclosure. Therefore, modified or changed embodiments are included in the range of the claims of the present disclosure.

The invention claimed is:

1. A washing machine comprising:
   a tub;
   a washing tub rotatably installed inside the tub;
   a ball balancer disposed in the washing tub and including a balancer housing having a channel having an annual shape, at least one ball movably provided in the channel, and a reinforcing member disposed on an outer surface of the balancer housing,
   wherein the balancer housing includes a first inner surface including first contacts with which one side of the at least one ball contacts when the at least one ball moves and a second inner surface including second contacts with which the other side of the at least one ball contacts, and
   the reinforcing member is disposed between a virtual horizontal plane passing through the first contacts and a virtual vertical plane passing through the second contacts,
   wherein an outer circumferential surface of the ball balancer is disposed to be in contact with an upper side of an inner circumferential surface of the washing tub and includes a hanging groove provided on an upper surface of the balancer housing in an annular shape, and
   the washing tub includes a hanging portion bent to the inside of the washing tub so as to be in contact with the hanging groove.

2. The washing machine of claim 1, wherein the first inner surface is provided to correspond to an outer circumferential surface of the balancer housing, and the second inner surface provided to be in contact with the first inner surface.

3. The washing machine of claim 2, wherein the second inner surface is provided to be in contact with a lower side of the first inner surface, and the reinforcing member is disposed below the first tracking path.

4. The washing machine of claim 3, wherein the reinforcing member is disposed between a virtual horizontal plane passing through the first contacts and a virtual vertical plane passing through the second contacts.

5. The washing machine of claim 2, wherein the second inner surface is provided to be in contact with a lower side of the first inner surface, and the reinforcing member is disposed outside the second tracking path in a radial direction of the channel.

6. The washing machine of claim 1, wherein the channel further includes a non-contact portion formed between the first tracking path and the second tracking path and not to be contacted with the at least one ball.

7. The washing machine of claim 1, wherein the reinforcing member is provided not to deviate from the area of the outer surface of the balancer housing corresponding to the area between the first tracking path and the second tracking path.

8. The washing machine of claim 1, wherein the reinforcing member includes a plurality of ribs formed along the outer surface of the balancer housing.

9. The washing machine of claim 1, further comprising a cover tub disposed above the tub and provided in an annular shape.

10. The washing machine of claim 9, wherein the balancer housing includes a blocking rib disposed adjacent to an outer circumferential surface of the balancer housing and extending upwardly from an upper surface of the balancer housing and having an annular shape.

11. The washing machine of claim 10, wherein an imaginary straight line connecting a first point of a lower end of an inner circumferential surface of the cover tub and a second point of an upper end of an outer circumferential surface of the washing tub does not penetrate an outer circumferential surface of the balancer housing.

12. The washing machine of claim 9, wherein the cover tub includes a blocking rib disposed adjacent to an outer circumferential surface of the balancer housing and extending upwardly from an upper surface of the balancer housing and having an annular shape.

13. The washing machine of claim 1, wherein the balancer housing includes a blocking rib disposed radially inward of the hanging groove of the balancer housing and extending upward from the upper surface of the balancer housing and provided in an annular shape.

14. The washing machine of claim 13, further comprising a cover tub disposed above the tub and provided in an annular shape,
wherein an imaginary straight line connecting a first point of a lower end of an inner circumferential surface of the cover tub and a second point of an upper end of the outer circumferential surface of the washing tub is provided not to penetrate a latching portion.

* * * * *